United States Patent
Naito

[19]

[11] Patent Number: 6,144,626
[45] Date of Patent: Nov. 7, 2000

[54] OPTICAL INFORMATION RECORDING-REPRODUCING APPARATUS FOR EFFECTING RECORDING/REPRODUCTION OF INFORMATION BY USE OF A PLURALITY OF LIGHT SPOTS

[75] Inventor: Yuichi Naito, Yokohama, Japan

[73] Assignee: Canon Kabushiki Kaisha, Tokyo, Japan

[21] Appl. No.: 08/990,745

[22] Filed: Dec. 15, 1997

[30] Foreign Application Priority Data

Dec. 13, 1996 [JP] Japan .................................. 8-333632

[51] Int. Cl.$^7$ ........................................................ G11B 7/00
[52] U.S. Cl. .......................... 369/44.37; 369/32; 369/109
[58] Field of Search .................................. 369/30, 32, 13, 369/44.11, 44.25, 277, 278, 279, 44.29, 44.37, 109, 44.23, 112, 110, 44.38, 44.32, 116

[56] References Cited

U.S. PATENT DOCUMENTS

| | | | |
|---|---|---|---|
| 5,018,123 | 5/1991 | Hosoya et al. ........................ | 369/44.11 |
| 5,153,863 | 10/1992 | Noda et al. .......................... | 369/44.11 |
| 5,410,137 | 4/1995 | Ichikawa ............................. | 235/436 |
| 5,444,224 | 8/1995 | Miyamoto ........................... | 235/454 |
| 5,835,471 | 11/1998 | Miyamoto et al. ................... | 369/109 |
| 5,923,631 | 7/1999 | Inoue et al. .......................... | 369/109 |

Primary Examiner—Ali Neyzari
Attorney, Agent, or Firm—Fitzpatrick, Cella, Harper & Scinto

[57] ABSTRACT

In an optical information recording-reproducing apparatus, a spot for recording and a plurality of spots for reproduction irradiate, from an optical head, an information recording medium having a plurality of tracks and having address information recorded at the head of each track. The plurality of light spots are caused to scan the plurality of information tracks of the recording medium at one time to thereby record information or reproduce recorded information. Further, in the apparatus, such determination is made, on the basis of the address information reproduced by a predetermined preceding one of the plurality of spots for reproduction, as to whether the track on which the spot for recording or the spots for reproduction are positioned is a target track.

6 Claims, 8 Drawing Sheets

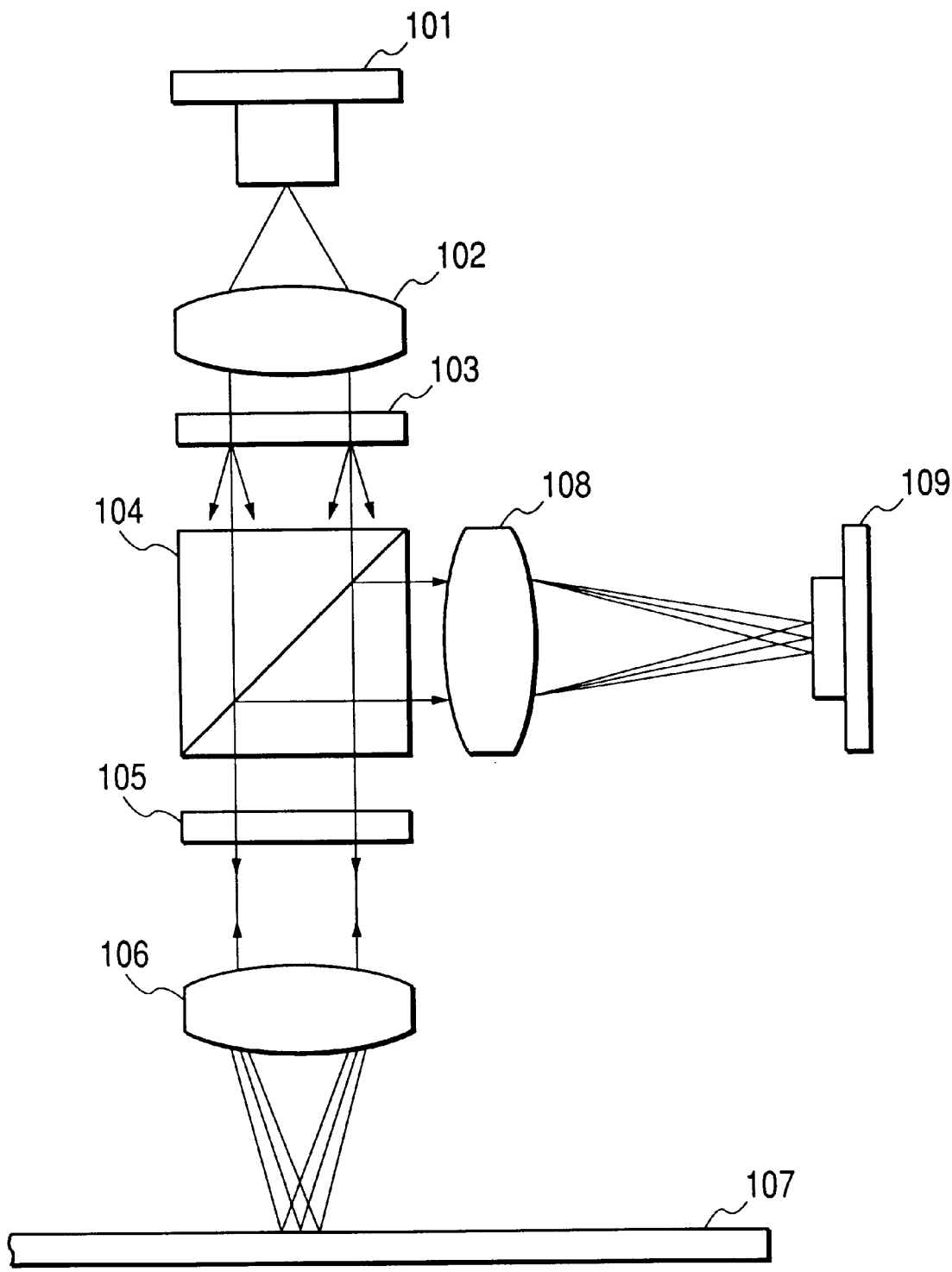

OPTICAL INFORMATION RECORDING-REPRODUCING APPARATUS FOR EFFECTING RECORDING/REPRODUCTION OF INFORMATION BY USE OF A PLURALITY OF LIGHT SPOTS

BACKGROUND OF THE INVENTION

1. Field of the Invention

This invention relates to an optical information recording-reproducing apparatus for optically recording or reproducing information on an information recording medium, and more particularly to an optical information recording-reproducing apparatus having the function of applying a plurality of reproducing spots at a time.

2. Related Background Art

The following forms of a recording medium for optically recording information thereon or reading out recorded information therefrom, are known: a disc-like form a card-like form; and a tape-like form. These optical information recording media include one capable of recording and reproducing and one capable of reproducing only. Particularly, the card-like recording medium (hereinafter referred to as the optical card) is expected to have its use expanded because of its ease of manufacture, good portability, and the good accessibility thereof.

Various optical information recording-reproducing apparatus directed to such an optical card have been proposed, and in any one of them, the recording and reproduction of information are effected while auto-tracking and auto-focus control are always effected. Also, as regards the recording of information onto the recording medium, a light beam modulated in accordance with recording information and stopped down into a micro light spot is scanned on an information track, whereby information is recorded as an optically detectable information bit string. The reproduction of information from the recording medium is effected by scanning a light beam spot of such a degree of constant power that recording is not effected on the recording medium on the information bit string of the information track, and detecting the reflected light from or the transmitted light through the recording medium at this time. As such an information recording-reproducing apparatus, there is also known an apparatus for reproducing data from a plurality of tracks at a time.

FIG. 1 of the accompanying drawings shows an example of an optical system (optical head) used in an optical information recording-reproducing apparatus for reproducing information of a plurality of tracks at a time. In FIG. 1, reference numeral 101 designates a semiconductor laser provided as a light source for recording and reproduction. A light beam emitted from the semiconductor laser 101 is collimated by a collimator lens 102, whereafter it is divided into a plurality of light beams by a diffraction grating 103, and is condensed on an optical card 107 via a polarizing beam splitter 104, a quarter wavelength plate 105 and an objective lens 106. The reflected light from the optical card 107 enters a photodetector 109 via the objective lens 106, the quarter wavelength plate 105, the polarizing beam splitter 104 and a toric lens 108. At this time, recording, reproduction and auto-focus control (hereinafter referred to as AF) are effected by the use of 0-order diffracted light of the light beams divided by the diffraction grating 103, auto-tracking control (hereinafter referred to as AT) is effected by the use of ± first-order diffracted light, and the reproduction of data from an adjacent track is effected by the use of ± second-order diffracted light. AF is of the astigmatic type, and AT is of the three-beam type.

FIG. 2A of the accompanying drawings is a schematic plan view showing the optical card 107 used in the information recording-reproducing apparatus as described above. A number of information tracks for recording and reproducing information are arranged in parallel on the optical card 107, and some of them are designated as T1, T2 and T3. These information tracks are demarcated by tracking tracks tt1–tt4. The tracking tracks tt1–tt4 are formed by grooves or a substance differing in reflectance from the tracks T1–T3, and are used as guides for obtaining a tracking error signal.

Also, reference numeral 112 designates the light spot of 0-order diffracted light, reference numerals 111 and 113 denote the light spots of ± first-order diffracted light, and reference numerals 110 and 114 designate the light spots of ± second-order diffracted lights. These five light spots are disposed on straight lines having a predetermined angle of inclination θ with respect to the tracks, and the light spot 112 lies on the central track T2, the light spots 111 and 113 lie on the tracking tracks tt2 and tt3, respectively, and the light spots 110 and 114 lie on the tracks T1 and T3, respectively, adjacent to the track T2. That is, these light spots are disposed rotation-symmetrically with respect to the central light spot 112. The light spot 112 is used for recording, reproduction and focus control as previously described, the light spots 111 and 113 are used for tracking control, and the light spots 110 and 114 are used for reproduction. Accordingly, in the case of reproduction, three tracks can be reproduced at a time by the light spots 110, 112 and 114.

These light spots scan over the optical card 107 from left to right as viewed in FIG. 2A by a mechanism, not shown, while keeping the same positional relation, whereby the recording or reproduction of information is effected. This scanning system may be of a type in which the optical system is moved or a type in which the optical card is moved, but in any of these types, the optical system and the optical card are reciprocally moved relative to each other and therefore, portions which are not at a constant velocity are created at the opposite ends of the optical card. This state is shown in FIG. 2B of the accompanying drawings. The abscissas axis of FIG. 2B represents the left to right direction of the optical card, and the ordinate axis represents the scanning velocity. When the light spots are to be scanned from left to right in FIG. 2B, acceleration is first effected in an acceleration region, and when a predetermined velocity is reached, scanning is effected at a constant velocity, and when a predetermined position is reached, deceleration is effected during a deceleration period, and the scanning of a track is terminated.

Further, as shown in FIG. 2A, track numbers Tn1L, Tn2L, Tn3L and Tn1R, Tn2R, Tn3R for identifying the respective tracks are pre-recorded on the tracks T1, T2 and T3 of the optical card 107. As such track numbers, there is a type in which the track numbers are recorded only on one side of the respective tracks, but it is convenient when information is recorded or reproduced in a bilateral direction relative to the tracks to record the track numbers on both sides of the tracks as shown in FIG. 2A. It is popular that each track number is error-correction-encoded to enhance the reliability of the identification and the same number is recorded a plurality of times. Such track numbers are reproduced and recognized at the start of the scanning of the light spots, i.e., at the beginning of a constant velocity region, and whether the track is a desired track is confirmed. Accordingly, the space between the track numbers on both sides provides an information recording region, and in this region, the light spots are scanned and the recording or reproduction of information is effected.

A description will now be provided of the process until the optical information recording/reproducing apparatus according to the prior art records information on the target track of an optical card. When a recording command is first issued from a host control apparatus (for example, a host computer) and recording data is transferred, the process of adding an error correction code to the recording data is carried out by an error encoder in the apparatus. As the error correction code, use is made, for example, of a Reed-Solomon product code, a difference set cyclic code or the like. When the process of adding the error correction code is completed, the seek operation for moving an optical head to the target track is effected. When at this time, the target track is T2 in FIG. 2A, the disposition of reproducing spots 110, 112 and 114 is as shown in FIG. 2A. When the optical head arrives at the target track, the seek operation is terminated and the optical head and the optical card are moved along the track direction to each other, and the light spots are scanned over the information tracks T1, T2 and T3.

Assuming here that the light spots have been scanned in the direction of arrow R in FIG. 2A, when acceleration is effected in an acceleration/deceleration region at the right side of FIG. 2A and a predetermined velocity is reached, scanning is effected at a constant velocity, and when a constant velocity region is entered, track numbers Tn1L, Tn2L and Tn3L recorded at the left head of the track are first reproduced at a time. Then, error correction decoding is effected by an error decoder because an error correction code is added to each track number. When the error correction decoding has been completed and it is confirmed from the track numbers that the tracks are T1, T2 and T3, the recording of information is effected on an information recording region.

A description will now be provided of the process until information already recorded on the information recording region of the target track of the optical card is reproduced. When a reproducing command is first issued from the host control apparatus, the seek operation for moving the optical head to the target tracks, as in the case of recording, is effected. If at this time, the target tracks are T1, T2 and T3 in FIG. 2A, the disposition of the reproducing spots 110, 112 and 114 becomes as shown in FIG. 2A. When the optical head arrives at the target tracks, the seek operation is completed and the optical head and the optical card are reciprocally moved in the track direction relative to each other, and the light spots are scanned over the information tracks T1, T2 and T3.

Assuming here that the light spots have been scanned in the direction of arrow R in FIG. 2A, acceleration is effected in the acceleration/deceleration region at the left side of FIG. 2A, as in the case of recording, and when a predetermined velocity is reached, scanning is effected at a constant velocity. When the constant velocity region is entered, track numbers Tn1L, Tn2L and Tn3L recorded at the left heads of the tracks are first reproduced, whereafter error correction decoding is effected by the error decoder because an error correction code is added to each track number. When the error correction decoding is completed and it is confirmed from the track numbers that the tracks are T1, T2 and T3, the reproduction of information already recorded on the information recording regions of the tracks T1, T2 and T3 is effected.

Now, in the prior art, when recording or reproduction is to be effected on an optical card, the respective track numbers of three tracks are reproduced at the beginning of the constant velocity region and the error correction decoding of all the three reproduced track numbers is effected to thereby determine whether the track is a desired track. Such determination of the track must be completed within a period during which the light spot passes through the gap portion between the track number portion and the data portion. However, if an attempt is made to make the relative movement velocity of the optical head and the optical card higher to improve throughput, the time during which the light spot passes through the gap portion will become short. Therefore, the time will become deficient to effect the deterioration of all of three tracks, and this has led to the problem that the light spot arrives at the data portion before the determination of the tracks is completed, and the recording or reproduction of information becomes impossible. Also, to shorten the time for determining the tracks, a CPU (central processing unit) and an error correction decoder can be made higher in speed, but such a method has led to the problem of higher cost.

SUMMARY OF THE INVENTION

So, the present invention, in view of the above-noted problems peculiar to the prior art, has as its object to provide an optical recording-reproducing apparatus which can simply improve throughput.

The above object is achieved by an optical information recording-reproducing apparatus in which a spot for recording and a plurality of spots for reproduction are projected from an optical head onto an information recording medium having a plurality of tracks and having address information recorded at the head of each track to cause the plurality of light spots to simultaneously scan the plurality of information tracks of the recording medium to thereby record information or reproduce recorded information, includes means for determining on the basis of the address information reproduced by a predetermined preceding one of the plurality of spots for reproduction whether the track on which the spot for recording or the spots for reproduction are positioned is a target track.

The invention will hereinafter be described in detail with respect to some embodiments thereof.

BRIEF DESCRIPTION OF THE DRAWINGS

FIG. 1 shows the optical system of an optical information recording-reproducing apparatus according to the prior art.

DESCRIPTION OF THE PREFERRED EMBODIMENTS

Some embodiments of the present invention will hereinafter be described in detail with reference to the drawings.

Figures 2A, 2B:
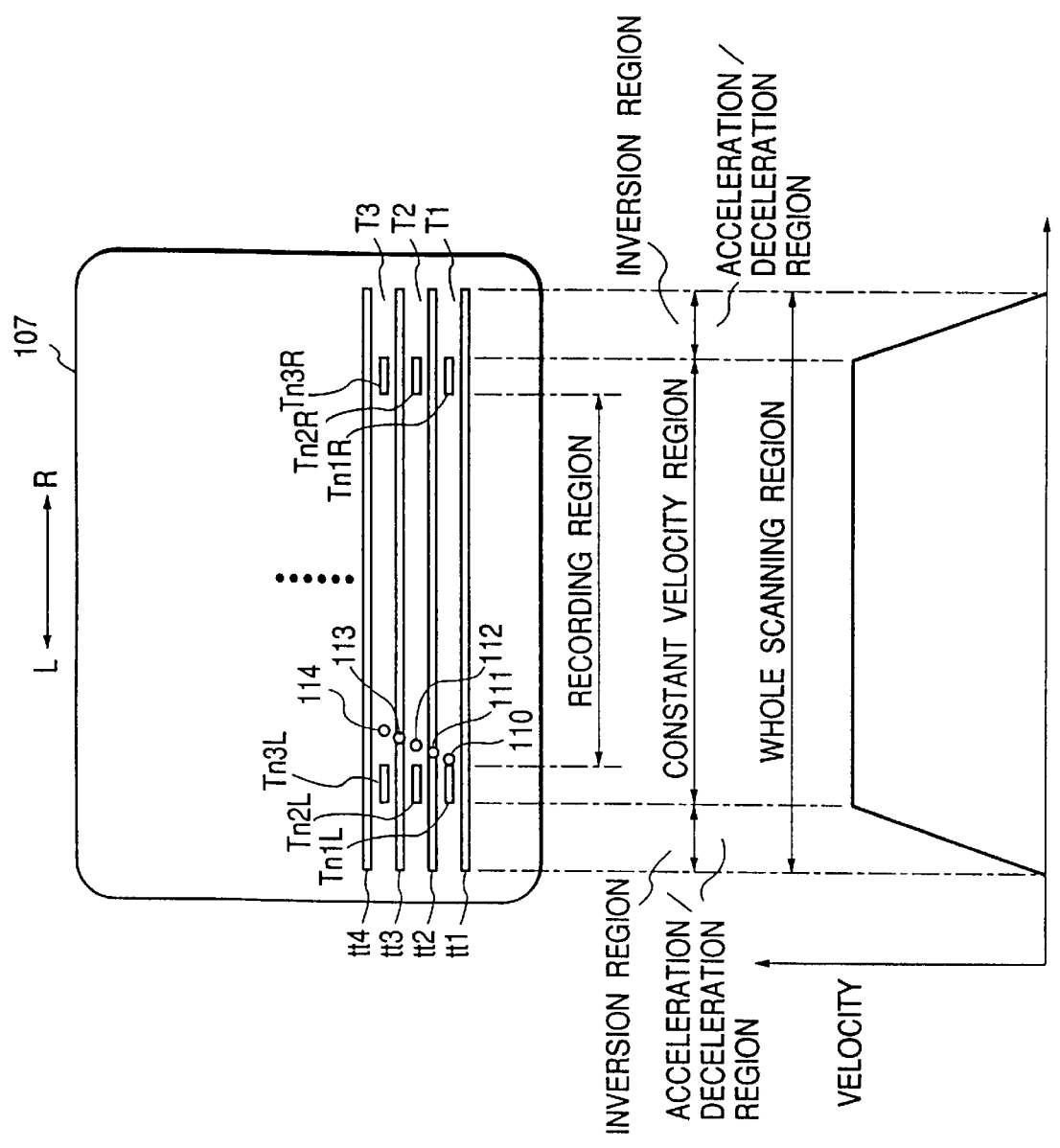
FIG. 2A shows the recording surface of an optical card.
FIG. 2B shows scanning velocity on the recording surface.
Figure 3:
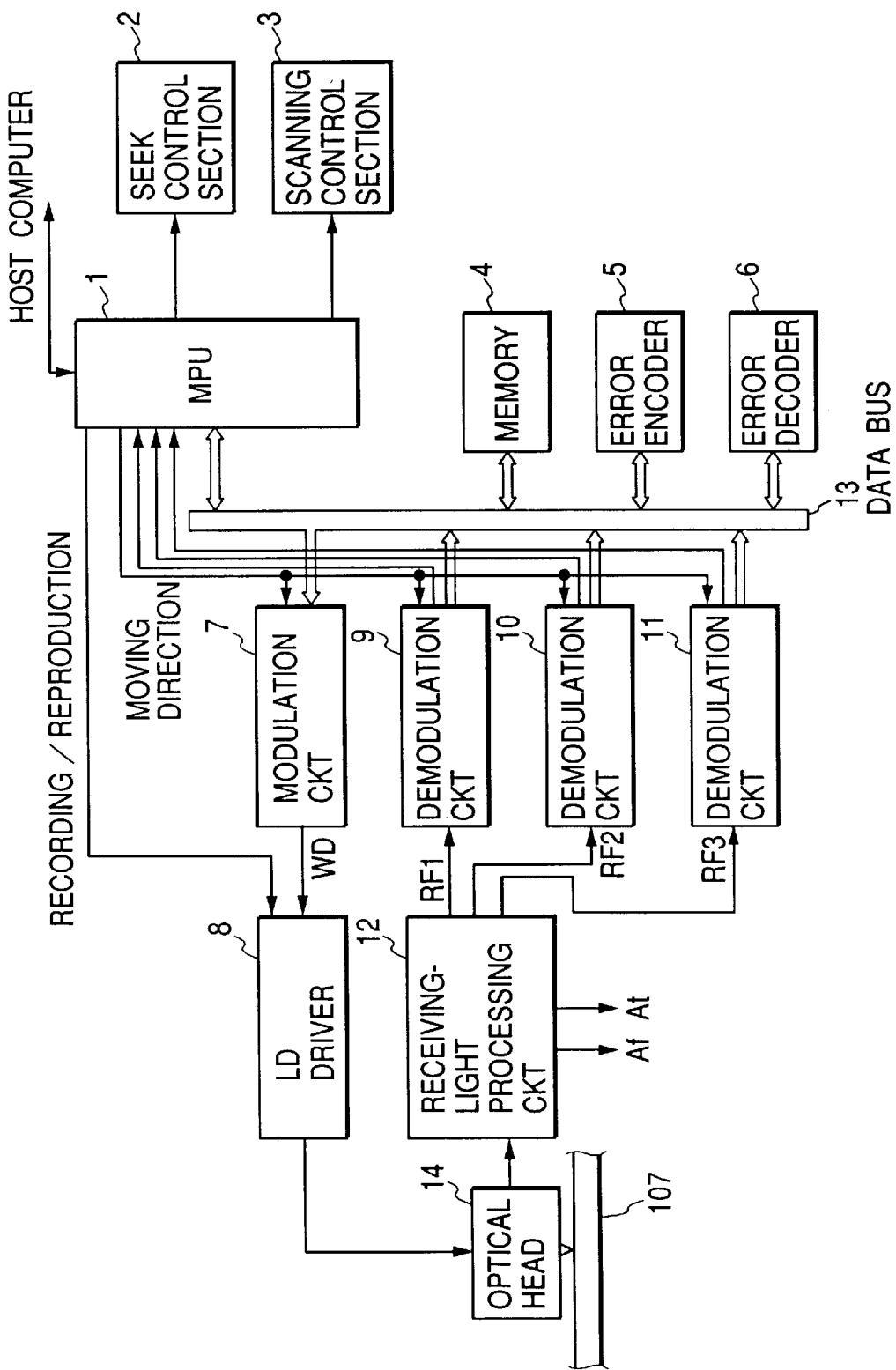
FIG. 3 is a block diagram showing the construction of an embodiment of the present invention.

FIG. 3 is a diagram showing the construction of an embodiment of the present invention. It is to be understood that the optical card of FIG. 2 is used in this embodiment. It is also to be understood that as shown in FIG. 2A, five light spots are applied onto the optical card and by the use of a light spot 112, recording, reproduction and focus control are effected, and by the use of light spots 111 and 113, tracking control is effected, and by the use of light spots 110, 112 and 114, three tracks are reproduced at a time.

In FIG. 3, reference numeral 1 designates an MPU for controlling various sections in the apparatus. The MPU 1 effects the exchange of commands and data with a host computer, not shown, and effects the control of recording information on the optical card 107 on the basis of the instructions of the host computer, and the reproducing of recorded information. A seek control section 2 is a control circuit for controlling a head feeding motor, not shown, on the basis of the instructions of the MPU 1, move an optical head 14 in the transverse direction of tracks and causing it to seek the target track of the optical card 107. A scan control section 3 is a control circuit for controlling a card feeding motor, not shown, on the basis of the instructions of the MPU 1 to reciprocally moving the optical card 107 in the direction of tracks. By thus reciprocally moving the optical card 107 in the direction of tracks, the optical head 14 and the optical card 107 are reciprocally moved in the direction of tracks relative to each other, and a light beam from the optical head 14 is reciprocally scanned over information tracks. Also, in the scan control section 3, when the optical card 107 is to be reciprocally moved, velocity control is effected in the manner of acceleration, constant velocity and deceleration as shown in FIG. 2B.

A memory 4 is a memory for temporarily storing therein recording data transferred from the host computer and reproduction data read out from the optical card 107, and an error encoder 5 is a circuit for adding an error correction code to the recording data. An error decoder 6 is a circuit for effecting the detection and correction of the error of the reproduction data, a modulation circuit 7 is a circuit for working the recording data into a signal suited to be recorded on the optical card 107, and demodulation circuits 9, 10 and 11 are circuits corresponding to three light spots 110, 112 and 114 for reproduction, respectively, and for demodulating the information reproduction signals RF1, RF2 and RF3 of three information tracks reproduced by these light spots, and restoring them to the original data. The memory 4, the error encoder 5, the error decoder 6, the modulation circuit 7 and the demodulation circuits 9, 10, 11 are connected to the MPU 1 by a data bus 13. The specific construction of the modulation circuit 7 and demodulation circuits 9, 10, 11 will be described later in detail.

An LD driver 8 is a laser driving circuit for driving a semiconductor laser in the optical head 14. That is, the optical head 14 comprises an optical system as shown in FIG. 1, and has a semiconductor laser 101 as a light source for recording and reproduction provided therein. The LD driver 8 drives the semiconductor laser 101 on the basis of the instructions of the MPU 1, and when information is to be recorded, it causes the light output of the semiconductor laser 101 to achieve a recording power and drives the semiconductor laser 101 in conformity with a modulation signal (information bit string WD) modulated by the modulation circuit 7 to thereby scan a light beam intensity-modulated in conformity with the information bit string and effect the recording of information on the information tracks of the optical card 107. On the other hand, when recorded information is to be reproduced, the semiconductor laser 101 is driven by the LD driver 8 so as to provide such a degree of constant reproducing power that cannot record, and this reproduction beam is scanned on the information tracks of the optical card 107 and the reproduction of recorded information is effected from the reflected light thereof.

A receiving-light processing circuit 12 is a signal processing circuit for effecting the reproduction of the recorded information. The receiving-light processing circuit 12 processes the receiving-light signal of a photodetector 109 in the optical head 14 and outputs information reproduction signals RF1, RF2, RF3, a tracking control signal At and a focus control signal Af. The tracking control signal and the focus control signal are outputted to a servo control circuit, not shown, in which a tracking actuator (not shown) provided in the optical head 14 is driven on the basis of the tracking control signal to displace an objective lens 106 in a tracking direction to thereby effect tracking control so that the light spots may follow and scan the information tracks. Also, in the servo control circuit, a focus actuator (not shown) in the optical head 14 is driven on the basis of the focus control signal to displace the objective lens 106 in a focus direction to thereby effect focus control so that the light spots may be focused on the surface of the medium. The information reproduction signals RF1, RF2 and RF3 are demodulated by the demodulation circuits 9, 10 and 11, respectively, as previously described.

Figure 4:
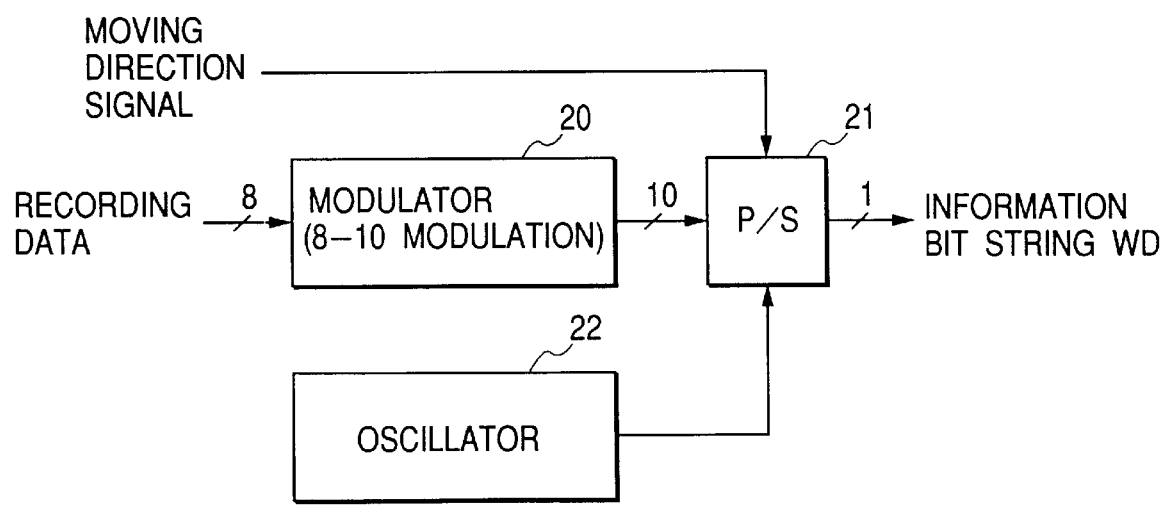
FIG. 4 shows a specific example of a modulation circuit in the embodiment of FIG. 3.

FIG. 4 is a block diagram showing a specific example of the modulation circuit 7. In FIG. 4, reference numeral 20 designates a modulator for modulating recording data sent from the MPU 1 through the data bus 13. Here is shown an example of (8–10) modulation. The recording data is data to which an error correction code has been added by the error encoder 5. The data modulated by the modulator 20 is sent to a p/s (parallel/serial) converter 21, by which the data is converted into a serial recording signal (information bit string WD). In this case, a clock signal of a predetermined frequency is generated by an oscillator 22, and in the p/s converter 21, the modulated data is converted into serial data in synchronism with the clock signal.

Here, a moving direction signal indicative of the scanning direction of the light spots is outputted from the MPU 1 to the p/s converter 21, and in conformity therewith, the disposition of the information bit string is changed over. That is, when information is to be recorded on the information track of the optical card from both directions of the forward way and backward way, the position of the bit is changed over for each byte by the moving direction signal so that the directions of arrangement of the information bit string may be the same.

Figure 5:
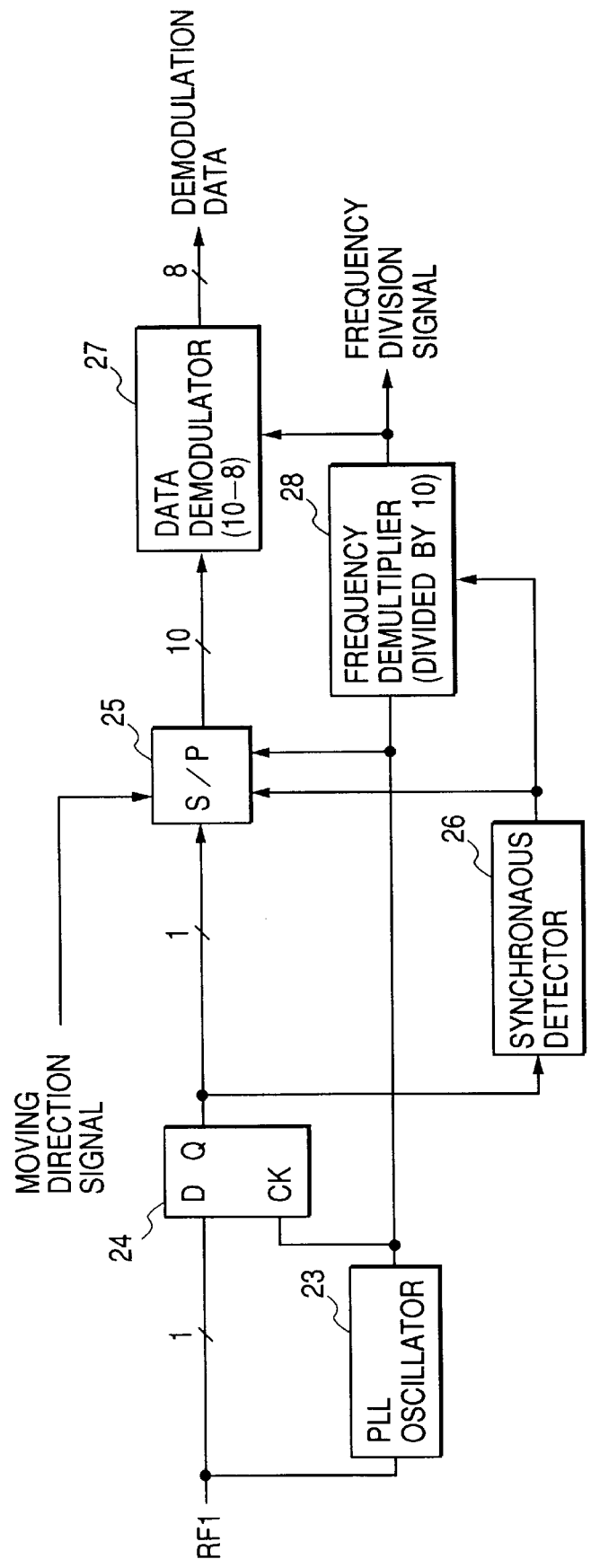
FIG. 5 is a circuit diagram showing a specific example of a demodulation circuit in the embodiment of FIG. 3.

FIG. 5 is a block diagram showing a specific example of the demodulation circuit 9. The demodulation circuits 10 and 11 are also of the same construction as the demodulation circuit 9. In FIG. 5, the information reproduction signal RF1 outputted from the receiving-light processing circuit 12 is first outputted to a PLL oscillator 23 and a synchronous clock signal is produced. The synchronous clock signal is outputted to a flip-flop 24, whereby the synchronism between the information reproduction signal RF1 and the synchronous clock signal is taken in the flip-flop 24. This is an ordinary method of taking synchronism in accordance with the actual movement because there is a fluctuation in the relative movement velocity of the recording medium and the light spots. The output signal of the flip-flop 24 is rearranged into a parallel signal at byte unit by an s/p (serial/parallel) converter 25. In this case, what part of a binary serial signal is the head of the byte is not known and therefore, usually recording is effected with a synchronous pattern added to the recording data.

As such a synchronous pattern, use is made of a pattern which is not in the data to be recorded. For example, in the case of 8–10 modulation, 256 types of data are made redundant into 1024 types and modulated and therefore, data which does not apply to the data is selected from among 1024 types and is used. This synchronous pattern is detected in a synchronous detector 26, whereby the parallel output of the s/p converter 25, comprised of a shift register, is controlled.

Since the serial signal inputted to the s/p converter 25 differs in whether the head bit of the data is LSB or MSB, depending on the scanning direction of the light spots on the optical card 107, the disposition of the bits of the output of the s/p converter 25 is changed over in conformity with the moving direction signal from the MPU 1. That is, when information is to be reproduced, the arrangement of the data is changed over for each byte so that the direction of arrangement of the data may be the same, independently of the scanning direction of the light spots. The output data of the s/p converter 25 is demodulated by a data demodulator 27 and is sent to the error decoder 6. The clock signal of the PLL oscillator 23 is frequency-divided by a frequency demultiplier 28 and the thus obtained frequency divided signal is serial/parallel-converted, whereafter it is used as a signal for taking synchronism at a byte unit in the data demodulator 27 and a transfer request signal to the memory relative to MPU 1.

Figure 6:
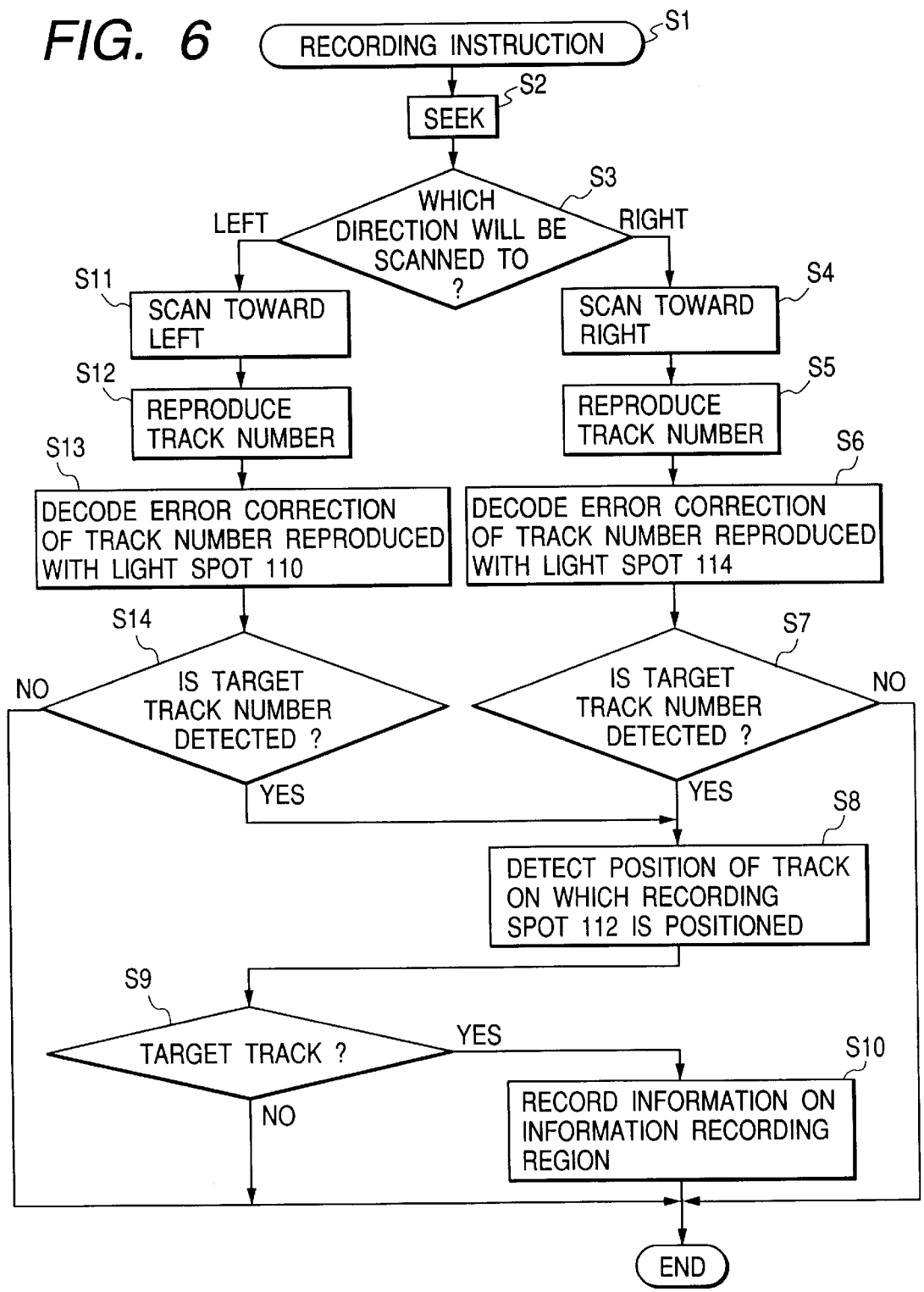
FIG. 6 is a flow chart showing the operation of the embodiment of FIG. 3 during information recording.

The operation of the present embodiment when information is recorded will now be described on the basis of the flow chart of FIG. 6. In FIG. 6, it is to be understood that at S1, a recording instruction has been issued from the host computer. When it receives the recording instruction, the MPU 1 stores in the memory 4 the recording data transferred from the host computer, and transfers the recording data stored in the memory 4 to the error encoder 5 and adds an error correction code to the recording data. Also, when it receives the recording instruction, the MPU 1 outputs a seek instruction to the seek control section 2. Thus, the optical head 14 starts to move in the transverse direction of the tracks of the optical card 107 by the control of the a seek operation control section 2, and effects seek toward a track designated by the host computer (S2).

The seek operation is effected so that during this seek operation, the central light spot 112 for recording may be positioned on a desired track. When the light spot 112 arrives at the desired track and the seek is completed, the MPU 1 outputs a scan instruction to the scan control section 3. At this time, at S3, the detection of the scan direction is effected, and if the scan direction is the direction R, advance is made to S4, and if the scan direction is the direction L, advance is made to S11. In this case, it is to be understood that the desired track is T2 in FIG. 2A and the optical head 14 and optical card 107 are moved in the direction R relative to each other, and advance is made to S4.

The optical card 107 is accelerated as shown in FIG. 2B by the control of the scan control section 3, and the optical head 14 and the optical card 107 start to move in the direction R relative to each other (S4). When the relative velocity of the optical head 14 and the optical card 107 reaches a target velocity, the scan control section 3 effects control so as to move at a constant velocity as shown in FIG. 2B. When entering into the constant velocity region, track numbers Tn1L–Tn3L recorded at the heads of the tracks as shown in FIG. 2A are reproduced (S5). The reproduced track numbers of the respective tracks are successively stored in the memory 4.

In this case, in the present embodiment, the error correction code is added to the track numbers and if the error correction decoding of the track numbers of all the three tracks is effected, much time will be taken and therefore, the track number reproduced by the most preceding light spot is transferred from the memory 4 to the error decoder 6, whereby error correction decoding is effected (S6). Then, the MPU 1 determines on the basis of the result of the error correction decoding whether the target track number Tn3L could be detected (S7). Usually, the track numbers are such that one and the same number is recorded a plurality of times to enhance the reliability of discrimination and therefore, a determination is performed by a majority decision or the like.

When at S7, the track number Tn3L is detected, the MPU 1 detects the position of the track on which the recording spot 112 is positioned (S8). The positional relation between the light spots is such as shown in FIG. 2A and therefore, when the track on which the most preceding light spot 114 is positioned is defined as Tx, the track on which the recording spot 112 is positioned is Tx-1. Accordingly, in this case, the track number reproduced by the light spot 114 is Tn3L and therefore, it can be detected that the track on which the recording spot 112 is positioned is T3-1=T2. Then, the MPU 1 determines whether the track on which the recording spot 112 is positioned is the target track (S9). At this time, the target track is T2 and therefore, YES is determined, and the MPU 1 controls each section and effects the recording of information on the information recording region of the target track T2 (S10). Also, if at S7, the track number could not be confirmed, the processing is intactly terminated, and if at S9, not the target track but for example, the track T1 is determined, it is a case where the seek operation has ended in failure and therefore, recording is not effected, but the processing is intactly terminated.

On the other hand, if at S3, the scan direction is the direction L, the optical card 107 is accelerated by the control of the scan control section 3, and the optical head 14 and the optical card 107 start to move in the direction L relative to each other (S11). When the relative movement velocity reaches the target velocity, the scan control section 3 controls head 14 and card 107 so as to move at a constant velocity, and when the constant velocity region is entered, the reproduction of the track number is likewise effected (S12). When the optical head and the optical card move in the direction L, the most preceding light spot is 110 as shown in FIG. 2A and therefore, the MPU 1 transfers the track number reproduced by the light spot 110 to the error decoder 6 to thereby effect error correction decoding (S13). Then, the MPU 1 determines on the basis of the result of the error correction decoding whether the track number of the target track could be detected (S14). In this case, the track reproduced by the light spot 110 is T1 and the track number thereof is Tn1R. When the target track number Tn1R is detected, the MPU 1 likewise detects the track on which the recording spot 112 is positioned (S8).

In the case of movement in the direction L, if the track on which the light spot 110 is positioned is defined as Tx, the track on which the recording spot 112 is positioned is Tx+1, and if the track number reproduced by the light spot 110 is Tn1R (track T1), it can be detected that the track on which the recording spot 112 is positioned is T1+1=T2. Then, the MPU 1 determines whether the track on which the recording spot 112 is positioned is the target track (S9), and if it is the target track, the recording of the information is effected on the information recording region of the target track (S10). If at S14, the track number cannot be confirmed or at S9, it is not the target track, the processing is likewise terminated without recording being effected.

Thus, in the present embodiment, when information is to be recorded, the error correction decoding of only the track number reproduced by the most preceding light spot is effected and whether it is the target track is determined by the use of the obtained track number and therefore, the positional difference between the preceding spot and the recording spot can be used as a time for determining the track on which the recording spot is positioned. Accordingly, even if the determination of the track is not effected at the gap portion between the track number portion and the data portion as in the prior art, the determination of the track can be effected at a point of time at which the track number has been read by the preceding spot and therefore, even if the relative movement velocity of the optical head and the optical card is made higher, the determination of the track becomes possible before the information recording region is entered, and throughput can be improved.

Figure 7:
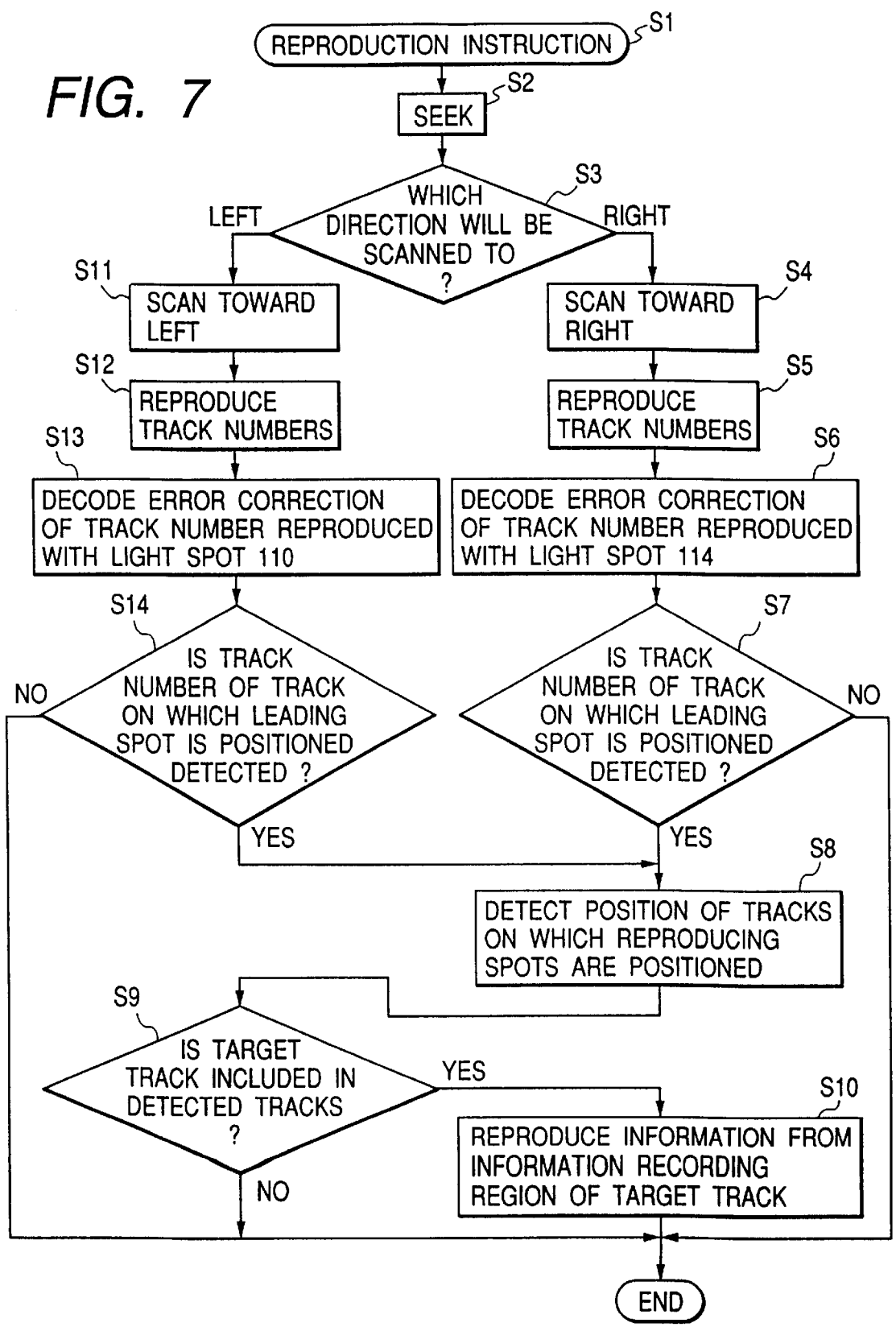
FIG. 7 is a flow chart showing the operation of the embodiment of FIG. 3 during information reproduction.

The operation of the present embodiment when information is reproduced will now be described on the basis of the flow chart of FIG. 7. Again in FIG. 7, it is to be understood that the track T2 of FIG. 2A is reproduced. Also, when information is to be reproduced, the operation is basically the same as the operation of FIG. 6 during the recording until the track is determined and therefore, this will be described briefly. In FIG. 7, when a reproduction instruction is first issued from the host computer (S1), the MPU 1 controls the seek control section 2 and causes the optical head 14 to seek the designated track (S2). Then, the MPU 1 determines the scan direction (S3), and if the scan direction is the direction R, scan in the direction R is started (S4) and the track numbers of three tracks are reproduced (S5). At this time, the MPU 1 sends only the track number reproduced by the most preceding light spot 114 to the error decoder 6 to thereby effect error correction decoding (S6), and determines on the basis of the result thereof whether the track number Tn3L of the track on which the preceding spot 114 was positioned could be detected (S7).

On the other hand, if at S3, the scan direction is the direction L, scanning in the direction L is started (S11) and the track numbers of the three tracks are reproduced (S12). Then, the error correction decoding of only the track number reproduced by the most preceding light spot 110 is effected (S13), and whether the track number Tn1R of the track on which the preceding spot 110 was positioned could be detected is determined (S14). If in this manner, at S7 and S14, the track on which the preceding spot is positioned in both of the direction R and the direction L can be confirmed, the MPU 1 detects the tracks on which the three light spots for reproduction are positioned (S8). In the case of the direction R, assuming that the track on which the preceding reproducing spot 114 is positioned is Tx, the tracks on which the remaining reproducing spots 110 and 112 are positioned are Tx-1 and Tx-2, respectively. Since the track number reproduced by the preceding spot 114 is Tn3L (track T3), it can be detected that the tracks on which the reproducing spots 110 and 112 are positioned are T3-1=T2 and T3-2=T1, respectively.

Also, in the case of the direction L, assuming that the track on which the preceding reproducing spot 110 is positioned is Tx, the tracks on which the remaining reproducing spots 112 and 114 are positioned are Tx+1 and Tx+2, respectively. Since the track number reproduced by the reproducing spot 110 is Tn1R (track T1), it can be detected that the tracks on which the reproducing spots 112 and 114 are positioned are T1+1=T2 and T1+2=T3, respectively. When the positions of the reproducing spots are detected in this manner, the MPU 1 determines whether the target track is included in the tracks on which the reproducing spots are positioned (S9). In this case, the target track is T2 and therefore, the target track is included in the tracks on which the reproducing spots are positioned, and the MPU 1 controls each section and effects the reproduction of the information recording region of the target track. Also, in the present embodiment, even if the target tracks are T1 and T2 or T1–T3, it is possible to reproduce a plurality of tracks at a time. If at S7 and S14, the target track number cannot be confirmed or if at S9, the target track is not included in the tracks on which the reproducing spots are positioned, the processing is intactly terminated.

As described above, in the present embodiment, when information is to be reproduced as well, the design of the apparatus is made such that the error correction decoding of only the track number reproduced by the preceding light spot is effected and the determination of the track is effected by the use of the obtained track number and therefore, the determination of the track can be effected at a point of time at which the track number has been read by the preceding spot. Accordingly, the relative movement velocity of the optical head and the optical card can be made high and throughput can be improved.

In the above-described embodiment, when the user fails to detect the track number by the preceding spot during the reproduction of information (the case of No at S7 and S14 of FIG. 7), the processing is terminated without reproduction being effected, but even if the user fails to detect the track number, the three tracks may intactly be reproduced. In this case, however, the track numbers other than the track number the user has failed to detect are stored in the memory 4 and after the termination of scanning, the error correction decoding of the track numbers stored in the memory 4 is effected. If at least one track number can be detected, it is used to detect the tracks on which the reproducing spots are positioned, and whether the target track is included in those tracks is determined.

Also, in the above-described embodiment, the three spots for reproduction are applied at a time, but alternatively, more spots for reproduction may be applied at a time in such a manner that each two spots for reproduction are applied to both sides of the spot for recording. In any case, it is desirable to effect the determination of the track by the use of the track number reproduced by the most preceding spot, but it is also effective to determine the track by the use of the track number reproduced by the reproducing spot preceding the recording spot.

Figure 8:
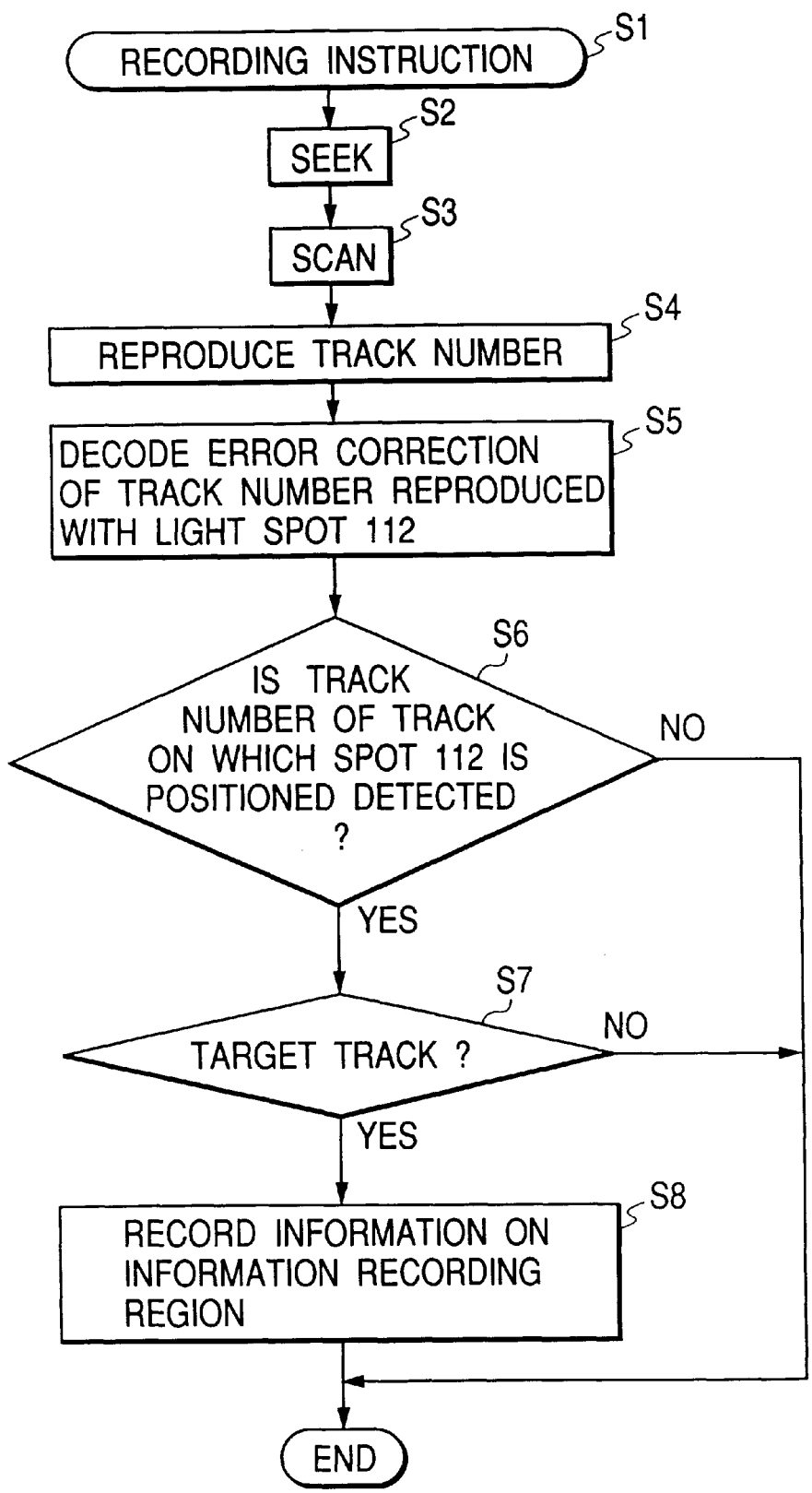
FIG. 8 is a flow chart for illustrating the operation of another embodiment of the present invention.

Another embodiment of the present invention will now be described with reference to FIG. 8. Again in this embodiment, a description will be provided with it being understood that information is recorded on the track T2 of FIG. 2A. In FIG. 8, when a recording instruction is first issued from the host computer (S1), the MPU 1 seeks the optical head 14 (S2), and determines the scan direction and starts scanning in that direction (S3). In this case, it is to be understood that the optical card 107 is moved in the direction R of FIG. 2A, and when the optical card 107 is accelerated to enter the constant velocity region, the track numbers of the three tracks are reproduced at a time and are stored in the memory 4 (S4).

Then, the MPU 1 transfers to the error decoder 6 only the track number reproduced by the same light spot 112 as the central recording spot to thereby effect error correction decoding (S5). When the error correction decoding is terminated, the MPU 1 determines whether the track number Tn2L of the track on which the light spot 112 was positioned could be detected (S6). When the track number Tn2L is confirmed, the MPU 1 determines whether the track of the track number Tn2L is the target track (S7), and if it is confirmed that the track is the target track T2, the recording of information is effected on the information recording region of the target track (S8). Also, if at S6, the track number cannot be confirmed or at S7, it is determined that the track is not the target track, the processing is intactly terminated.

On the other hand, when scanning is to be done in the direction L as well, the error correction decoding of only the track number reproduced by the same light spot 112 as the central recording spot is effected just as in the case of the direction R, and whether the reproduced track is the target track is determined by the use of the obtained track number. In the present embodiment, the design of the apparatus is made such that as described above, when information is to be recorded, only the track number reproduced by the same light spot as the recording light spot of the plurality of reproducing spots is error-correction-decoded and the determination of the track is effected by the use of the obtained track number and therefore, the process of detecting the track on which the recording spot is positioned as in the embodiment of FIG. 7 can be omitted and correspondingly, the time for determining the track can be shortened. Accordingly, again in this case, the relative movement velocity can be made higher than in the prior art.

As described above, according to the present invention, the determination of the track is effected on the basis of track address information reproduced by a predetermined preceding spot of a plurality of reproducing spots, whereby the determination of the track can be effected at a point of time at which the track address information has been read by the preceding spot. Accordingly, the track can be determined before the gap portion between the track number portion and the data portion and thus, even if the relative movement velocity is made high, it becomes possible to effect the recording and reproduction of information and throughput can be improved. Also, the determination of the track can be effected on the basis of the track address information reproduced by the same spot of the plurality of spots for reproduction as the spot for recording to thereby shorten the track determining process time, and correspondingly the relative movement velocity can be made higher.

What is claimed is:

1. An optical information recording-reproducing apparatus in which a spot for recording and a plurality of spots for reproduction irradiate, from an optical head, an information recording medium having a plurality of information tracks and having address information recorded at the head of each track to cause the plurality of light spots to simultaneously scan the plurality of information tracks of the recording medium to thereby record information or reproduce recorded information, wherein said plurality of spots for reproduction comprise preceding spots and remaining spots, wherein the preceding spots precede the remaining spots, including:

a determining device determining, on the basis of the address information reproduced by a predetermined one of said preceding spots, whether the track on which said spot for recording or said spots for reproduction are positioned is a target track.

2. An optical information recording-reproducing apparatus according to claim 1, wherein said preceding one of said plurality of spots is the most preceding spot for reproduction of said plurality of spots for reproduction.

3. An optical information recording-reproducing apparatus according to claim 1, wherein said preceding one of said plurality of spots is a spot for reproduction preceding the spot for recording.

4. An optical information recording-reproducing apparatus according to claim 1, wherein in the case of failing in detection of the address information by said predetermined spot for reproduction during the reproduction of the information, said determining device effects said determination on the basis of the address information reproduced by any other spot for reproduction than that which has failed in the detection of the address information.

5. An optical information recording-reproducing apparatus according to claim 1, wherein said address information is provided at the opposite ends of each track, and in the case of failing in the detection of the address information by said predetermined spot for reproduction during the reproduction of the information, said determining device effects said determination on the basis of the address information provided on the other end side reproduced by said plurality of spots for reproduction.

6. An optical information recording-reproducing apparatus according to claim 1, wherein said spot for recording is used for reproduction as well, and said determining device effects said determination on the basis of the address information reproduced by said spot for recording.

* * * * *

UNITED STATES PATENT AND TRADEMARK OFFICE
CERTIFICATE OF CORRECTION

PATENT NO. : 6,144,626

DATED : November 7, 2000

INVENTOR(S): YUICHI NAITO

It is certified that error appears in the above-identified patent and that said Letters Patent is hereby corrected as shown below:

SHEET NO. 5 OF THE DRAWINGS:
In Figure 5, "SYNCHRONAOUS" should read --SYNCHRONOUS--.

COLUMN 1:
Line 18, "therefrom," should read --therefrom--, and "form" should read --form;--.

COLUMN 2:
Line 15, "lights." should read --light.--.

COLUMN 7:
Line 39, "a" should be deleted.
Line 40, "operation" should be deleted, and "seek" should read --a seek operation.--.

Signed and Sealed this

Twenty-ninth Day of May, 2001

*Attest:*

NICHOLAS P. GODICI

*Attesting Officer*  *Acting Director of the United States Patent and Trademark Office*